United States Patent Office 3,486,840
Patented Dec. 30, 1969

3,486,840
APPARATUS FOR AND METHOD OF STERILISING BOTTLES
Harold Burton and John Anthony Pavey, Reading, Derek James Jayne-Williams, Swallowfield, near Reading, and William Frederick Hansen, Wokingham, England, assignors to National Research Development Corporation, London, England, a corporation of Great Britain
Original application Aug. 20, 1965, Ser. No. 481,364, now Patent No. 3,393,491, dated July 23, 1968. Divided and this application May 28, 1968, Ser. No. 732,682
Claims priority, application Great Britain, Oct. 30, 1964, 44,485/64
Int. Cl. A61l 3/00
U.S. Cl. 21—56          5 Claims

ABSTRACT OF THE DISCLOSURE

An apparatus for sterilising a container using pressurized steam. The container is housed in a sealable chamber having inlet and exit means for the steam passage, and a valve disposed in the exit means. The valve has two positions and is adapted in one of the positions to permit the exit of steam and is adapted in the other of said positions to divert steam into the container.

---

Figure 1:
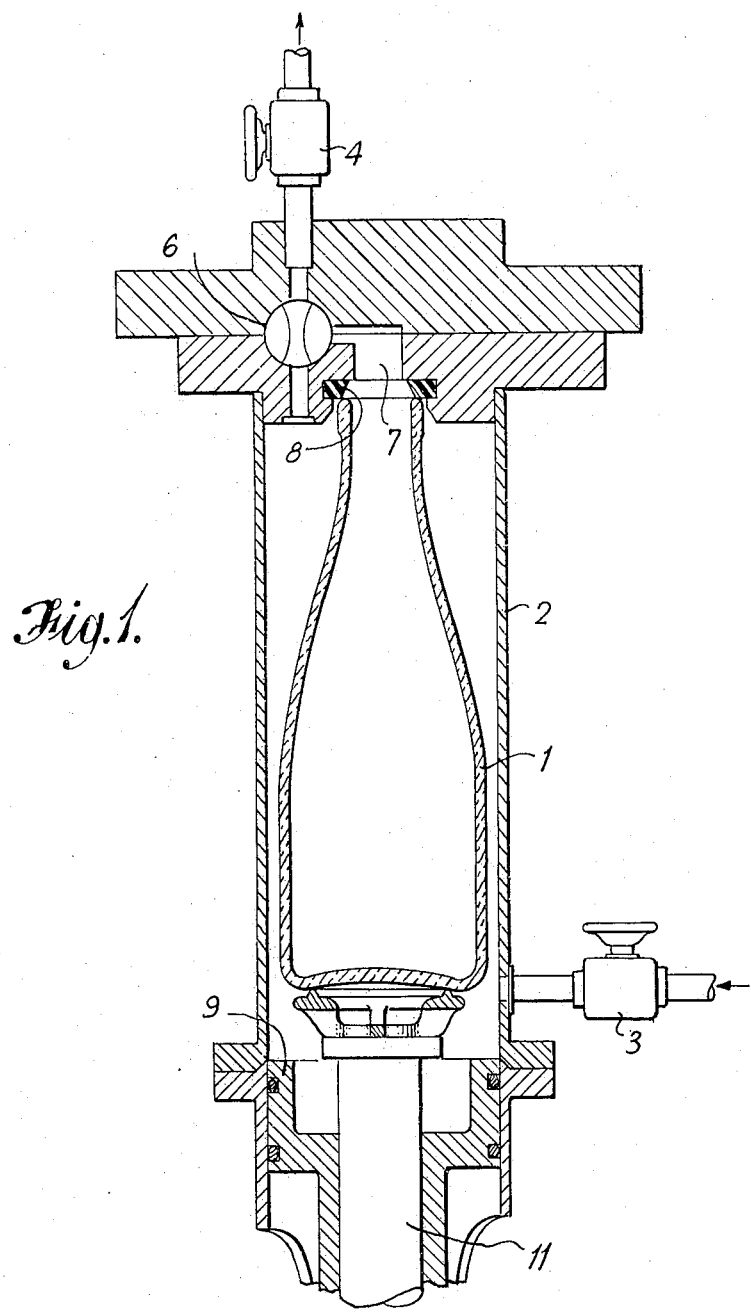

This is a divisional application of the applicant's copending United States patent application Ser. No. 481,364, filed Aug. 20, 1965, now U.S. Patent No. 3,393,491.

This invention relates to the sterilisation of bottles and the filling and capping of the sterilised bottles. For the purposes of this specification it is to be understood that the term "bottles" includes cans and other like containers to be sterilised and filled.

In some applications it is necessary to sterilise bottles after they have been washed. This is the case, for example, with milk bottles, which are usually of glass. A convenient sterilising agent is saturated steam under pressure, because it is clean, easy to control, readily available, and predictable in its bactericidal effect.

In the case of milk bottles, when these are sterilised by steam, it is usually most convenient, from the handling aspect, for the bottles to remain upright throughout the sterilising process, but there is a tendency for condensate to collect in the bottles and this may constitute adulteration of the milk subsequently filled into the bottles. An object of the present invention is to enable such condensate to be reduced to an acceptable level.

It is also desirable in some cases to fill the sterilised bottles with a liquid while preventing contamination of any sort. One such example is the aseptic bottling of milk sterilised in continuous flow by the ultra-high temperature process. Sterile milk filled in this way will remain sweet for a considerable length of time unrefrigerated. Of course there are a great many other applications, such as, for example, the bottling of pharmaceuical preparations. Thus another object of the invention is to provide a method and apparatus for dispensing a liquid into a sterilised bottle without contamination.

There is a method of sterilising a bottle by means of steam under pressure, which comprises preheating the bottle, from the outside thereof, within a container by initially passing the steam into and out of the container and then introducing steam into the bottle to sterilise the inside surface thereof, shutting off the supply of steam to the inside of the bottle, and allowing any condensate therein to boil off under the action of heat.

Preferably a vacuum is created within the bottle during the preheating thereof to remove air from within the bottle, which would otherwise prevent the steam from exerting its full sterilising effect. During the preheating it is also preferable to employ sealing means to prevent the steam from entering the bottle to restrict the formation of condensate. If desired a vacuum may also be created within the bottle after the sterilisation thereof, to supplement the action of heat in the removal of condensate. Sometimes, however, in the case of sterilising glass bottles, the creation of too strong a vacuum within the bottle can cause the bottle to crack since the condensate may boil off too quickly thereby cooling the inside of the bottle too quickly.

Conveniently, the initial passage of steam out of the container is utilised to create the said vacuum during preheating. The passage of steam into and out of the container may also be utilised to maintain the application of heat to the bottle during removal of condensate, and also, if desired, to create a vacuum within the bottle during such removal. It may be found in practice that sufficient heat and vacuum may be maintained for the removal of condensate by shutting off the supply of steam to the container when sterilisation of the bottle is completed and allowing the steam within the container to vent to atmosphere.

Apparatus for carrying out the foregoing method comprises a sealable container for housing the bottle, inlet and exit means for the passage of steam under pressure into and out of the container, and steam-ejector means associated with the said means and adapted to permit the exit of steam, and the simultaneous creation of vacuum within the bottle during the pre-heating thereof and controllable alternatively to divert steam into the bottle for the sterilisation thereof and again to permit the exit of steam and the simultaneous creation of a vacuum within the bottle during the removal of condensate therefrom.

Another feature of the invention is a valve for dispensing liquid into a sterilised bottle comprising a tube and a plunger mounted coaxially above the bottle with the upper end of the tube connected to a source of liquid, the plunger being adapted to form a seal with the tube so as to close the tube. Means are provided for effecting downward movement of the tube and plunger together from a first position to a second position while maintaining the seal between the tube and the plunger. First sealing means are provided which are adapted when the tube and plunger are at their first position to maintain a positive steam pressure within the bottle and to isolate that steam pressure from the seal between the tube and plunger, and second sealing means are provided which are adapted when the tube is at its second position to seal the tube to the mouth of the bottle so as to isolate the interior of the bottle from its surroundings, other than the tube. Means are provided for effecting further downward movement of the plunger relative to the tube to a third position so as to break the seal between the tube and plunger thereby putting the tube and hence the source in communication with the bottle while the bottle is still isolated from its surroundings other than through the tube. And means are also provided for effecting upward movement of the tube and plunger to return them to their first position.

Preferably, third sealing means are provided which are adapted, when the tube and plunger are at their first position, to maintain a partial vacuum within the bottle.

Preferably, a one-way safety valve is provided which is adapted in the event of failure of the first sealing means when the tube and plunger are at their first position, to allow the steam leaking past the first sealing means to vent to atmosphere so as to protect the seal between the tube and the plunger.

In some embodiments a sleeve is provided which is coaxial with the tube and the plunger and cooperates with the first sealing means to assist in isolating the seal between the tube and plunger from the bottle, and cooperates with the second sealing means to assist in isolating the bottle from its surroundings.

Another feature of the invention is the inclusion of means for capping the bottle after it has been filled (or partly filled if this is desired).

Another feature of the invention is the combination of the apparatus for sterilising the bottle with the apparatus for dispensing the liquid into the bottle so that the sterilising and filling can be done in a single apparatus.

Figure 2:
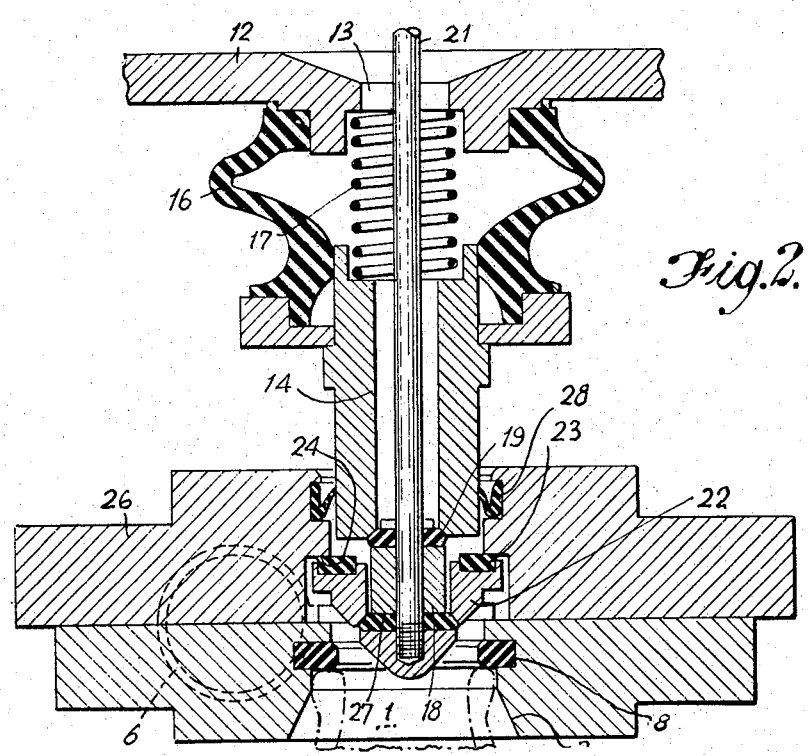
Figure 3:
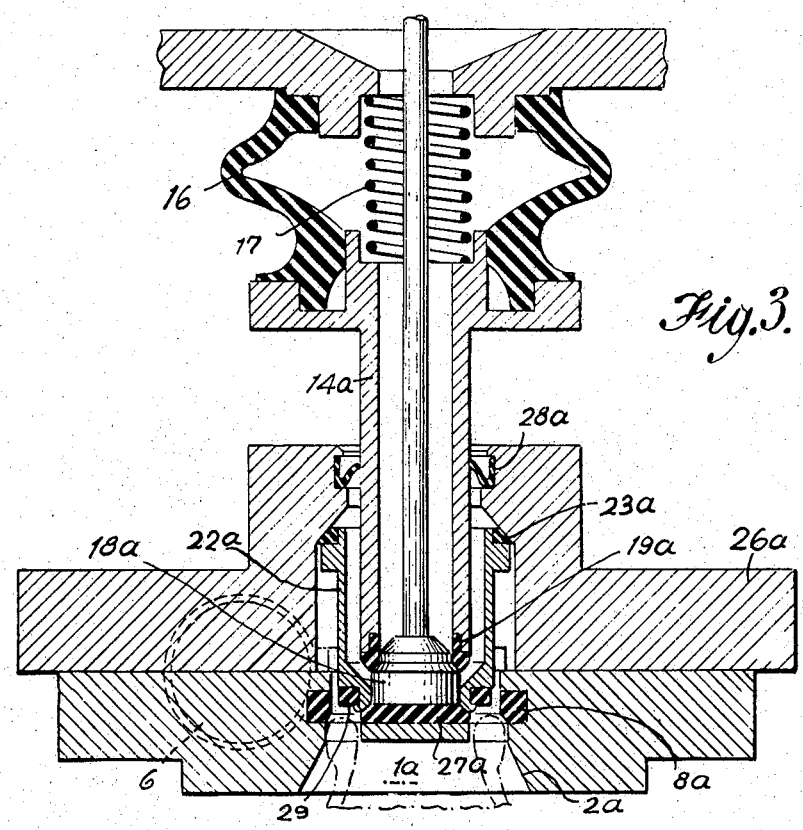
Figure 4:
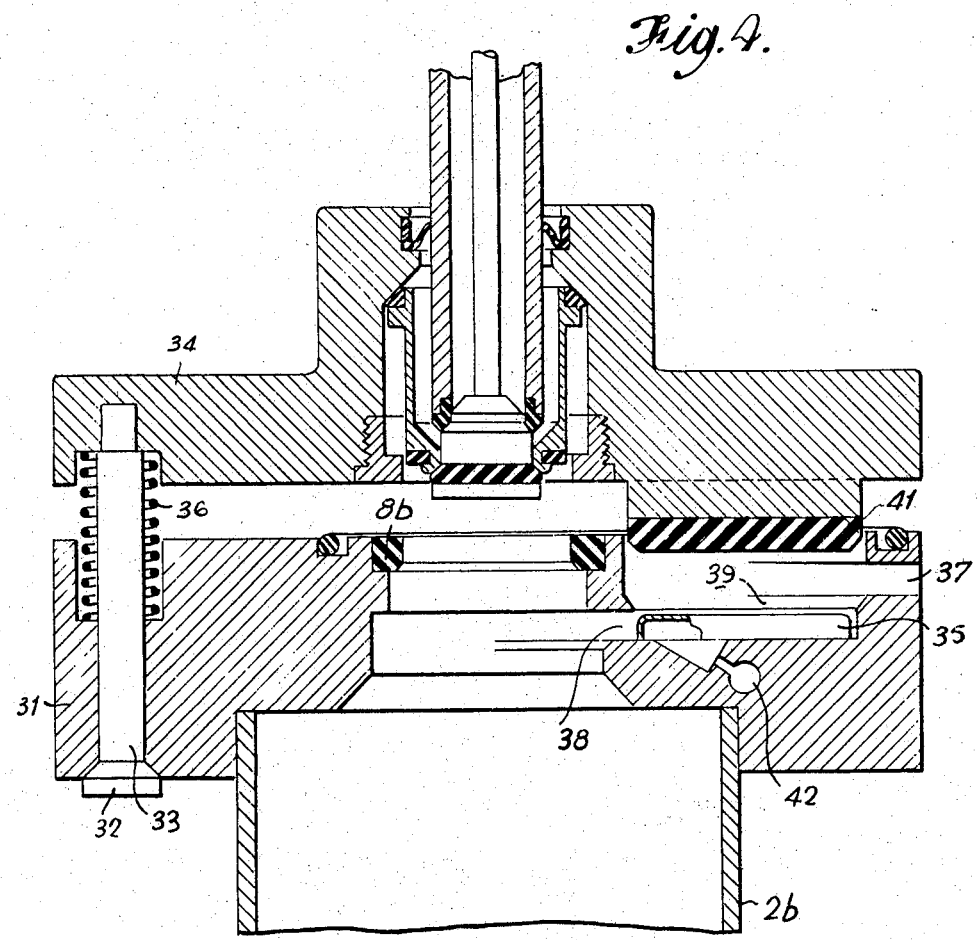
Figure 5:
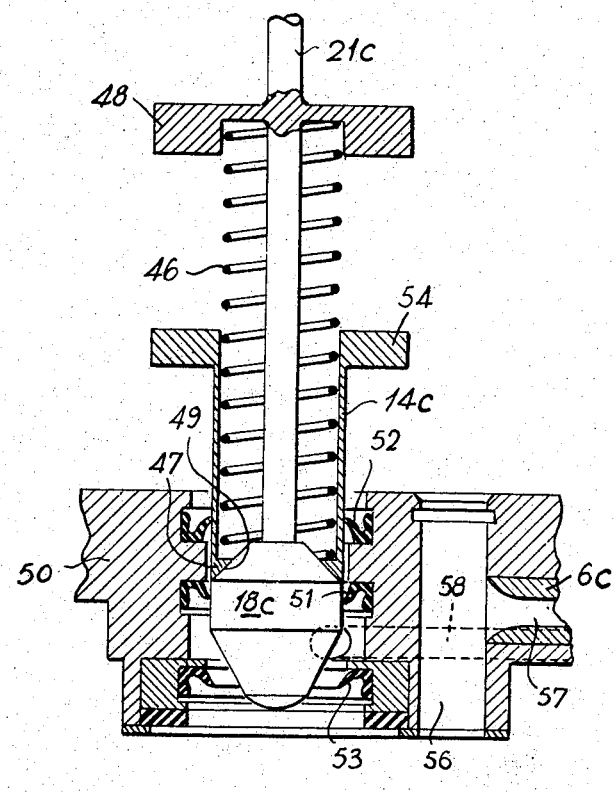

Specific embodiments of the invention will now be described with reference to the accompanying drawings in which:

FIGURE 1 is a sectional elevation of a simple form of apparatus for sterilising a bottle with a single milk bottle in operational position, FIGURE 2 is a vertical section through one embodiment of the apparatus for dispensing liquid into a bottle, FIGURE 3 is a vertical section through another embodiment of the dispensing apparatus, FIGURE 4 is a vertical section through the same embodiment as FIGURE 3, but modified to include means for capping the bottle after it has been filled and, FIGURE 5 is a vertical section through a third embodiment of the apparatus for dispensing liquid into a bottle.

Another feature of the invention is a combined method of sterilising and filling a bottle comprising the steps of sealing a dispensing tube so as to prevent the flow of liquid through the tube, locating a bottle at a station, sterilising the interior of the bottle with steam under pressure while isolating the steam from the seal in the dispensing tube, venting the steam from the interior of the bottle to reduce the pressure, moving the tube to the bottle and sealing the tube with the mouth of the bottle so as to isolate the interior of the bottle from its surroundings, and opening the dispensing tube to allow the liquid to flow from the tube into the bottle while maintaining the bottle isolated except through the tube.

In FIGURE 1 the bottle 1 is held in an upright position within a container 2, which is sealed (apart from its connections to inlet and exit ducts, in which valves 3 and 4 respectively are located) during the operating process. The bottle opening is also sealed off from communication with the remainder of the interior of the container (except as will be mentioned later, via a steam-ejector device 6 and a vacuum duct 7) by means of a sealing disc 8. The bottom of the container is sealed by ram 9, carrying a pneumatically-operated pedestal 11. The bottle 1 is urged upwards against the sealing disc 8 by the pedestal 11. The steam-ejector device 6 is capable of producing a vacuum in the bottle 1, via duct 7, when steam under pressure is passed through the container and out through the exit duct when valve 4 is open.

Initially, valve 4 is open. Saturated steam under pressure is introduced to the container through valve 3 and escapes through valve 4 after passing through the steam-ejector device 6. Steam pressure is thus maintained outside the bottle, while the steam-ejector maintains a vacuum within the bottle. The bottle is thus preheated during this stage, without any steam reaching the inside of the bottle to form condensate. The vacuum within the bottle facilitates the subsequent introduction of steam into the bottle, which is the next stage in the process.

Thus, when the bottle is sufficiently preheated (say after a period of the order of seven seconds) valve 4 is closed, and steam is then introduced into the bottle through the steam-ejector device 6 and duct 7. The inside surface of the bottle is sufficiently sterilised in about three seconds or so by the heat imparted by the steam and some condensate is formed in the bottle. The only supply of steam to the inside of the bottle is then shut off by the re-opening of valve 4, so that a vacuum is again created within the bottle, which continues to be heated from the outside thereof. The condensate boils off under the action of heat, assisted by the vacuum. After a further short time interval (or even possibly without any such further interval) valve 3 is closed and the steam pressure within the container drops to atmospheric as steam escapes through valve 4. The bottle can then be removed from the container by lowering the ram 11 together with the pedestal 9 until the bottle is clear of the container 2. The bottle is removed from the pedestal and the next bottle mounted on the pedestal by a convention conveyor system, for example a star-wheel system. Usually the bottle will be left in the container and filled with liquid before being removed from the container.

FIGURE 2 shows one embodiment of apparatus for dispensing fluid into the bottle after it has been sterilised. The bottle 1 remains in the same container 2 (only the top portion of which is shown in FIGURE 2) in which it was sterilised, the mouth of the bottle still being sealed against the sealing disc 8. A header tank 12 is mounted above the bottle 1 for holding a supply of liquid, in this case, sterile milk. The tank 12 has an orifice 13 in the bottom through which the sterile milk can pass into a tube 14. The tube 14 is flexibly connected to the tank 12 by means of bellows 16 which surround the orifice 13. The bellows 16 bias the tube 14 downwardly away from the tank 14, and a spring 17 can be provided between the tank 12 and the tube 14 to assist the bellows 16 in its biasing action. The lower end of the tube 14 is closed by a cylindrical plunger 18 which is coaxial with the tube and axially movable so that it can be moved up to abut against the lower end of the tube. The plunger 18 has a seal 19 on its upper surface which seals off the tube 14 thereby preventing milk from flowing out of the tube. A rod 21 is arranged coaxially with the plunger 18 and passes up along the axis of the tube 14. The rod 21 can be moved axially by any suitable means to move the plunger 18 and thus open or close the lower end of the tube 14 as required.

A floating sleeve 22 surrounds the plunger 18 with only a small clearance between the sleeve and the plunger to minimise the volume of milk trapped during operation. The sleeve 22 is provided with a seal 23 on its upper surface which seals with a shoulder 24 in the housing 26 when the sleeve 22 is forced upwards against the shoulder 24 by the force of the plunger 18. The seal 23 can also form a seal between the sleeve 22 and the tube 14 when these two members are engaged. The lower end of the sleeve 22 is bevelled both on its inner surface and on its outer surface. The bevel on the inner surface of the sleeve can engage with a seal 27 in the form of a protruding shoulder mounted on the plunger 18, and the outer bevel on the sleeve 22 can seal with the seal 8 mounted in the housing 26.

The bottle 1 is positioned in the container 2 in the housing 26 so that the mouth of the bottle abuts against the lower surface of seal 8. There is an annular space between the plunger 18 and seal 8 so that when the bottle 1 is in position as shown this annular space is in direct communication with the interior of the bottle. The steam ejector 6 (mentioned in connection with FIGURE 1) is provided in the housing 26 connecting with the annular space between the plunger 18 and the seal 8 and thence with the inside of the bottle 1.

In operation the interior of the bottle is evacuated, pressurised with steam and vented through the ejector 6 and the annular space between the plunger 18 and seal 8 as described above. Seals 27 and 23 retain both steam pressure and vacuum. If steam should leak past either seal during the sterilisation it will not enter the milk through seal 19 but will escape to atmosphere past an internal distributor seal 28 which is mounted around the tube 14 which prevents the entry of contamination.

To fill the bottle, plunger 18 is lowered. The sleeve 22, which is floating, moves down with the plunger 18 until the sleeve 22 engages with the seal 8. Further downward movement of the plunger causes the seal 27 to break, allowing a small amount of steam to pass into the space between the sleeve 22 and the plunger 18 to help to clean and sterilise this space. The tube 14 which is biased downwards against the plunger 18 at the seal 19 also moves down with the plunger until the tube 14 engages with the sleeve 22 via the seal 23. The biasing force from the bellows 16 and the spring 17 ensures that the seals at 8 and 23 are tight. The inside of the bottle is then completely isolated. After the milk tube 14 has reached the position to hold the sleeve 22 against the seal 8 further downward movement of the plunger 18 breaks the seal at 19 and admits milk to the bottle. The steam in the bottle is condensed, and the bottle fills completely and rapidly with milk: any froth or incondensable gas passes up through the valve into the header tank.

The valve is closed by withdrawing the plunger 18 upwards so that the initial position is regained. The amount of milk filled into the bottle is determined by the capacity of the bottle minus the displacement of the plunger in its downward or filling position.

FIGURE 3 shows another embodiment of the dispensing valve. This embodiment is very similar to the embodiment of FIGURE 2 elements in the embodiment illustrated in FIGURE 3 that are similar to elements in the embodiment illustrated in FIGURE 2 have been given the same reference numerals with the addition of suffix "a." The apparatus illustrated in FIGURE 3 differs from that shown in FIGURE 2 in that it will not allow filling when a bottle is not present in the container 2a. This modification is accomplished primarily by the provision of an additional seal 29 on the outer bevel at the lower end of the sleeve 22a. This seal 29 is adapted to engage with the mouth of the bottle 1a when the sleeve 22a is moved downwards. In this embodiment the seal 8a which seals the mouth of the bottle 1a against the housing 26a only seals with the outer portion of the top surface of the lip, thereby leaving the inner portion free to seal with seal 29. In this embodiment, the seal 19a is mounted on the lower end of the tube 14a rather than on the plunger 18a. The seal 19a serves the same purpose of sealing the plunger 18a against the tube 14a, but in addition the seal 19a also serves to engage with the sleeve 22a during downward motion of the plunger 18a.

In operation, the valve of FIGURE 3 is similar to the valve of FIGURE 2. After the interior of the bottle has been sterilised, the plunger 18a is lowered. The sleeve 22a and the tube 14a move down with the plunger until the sleeve engages with the mouth of the bottle via the seal 29. Further downward movement of the plunger 18a causes the seal 27a to break, allowing a small amount of steam to pass into the space between the sleeve 22a and the tube 14a to help clean and sterilise this space. Still further downward movement of the plunger 18a allows the tube 14a to press at 19a against the sleeve 22a. The inside of the bottle is then completely isolated. After the tube 14a has reached the position to hold the sleeve 22a against the bottle further downward movement of the plunger breaks the seal 19a between the plunger 18a and the tube 14a and admits milk to the bottle. If no bottle is present, the sleeve 22a continues downwards for the full valve travel; seal 19a will not be broken, and no milk will be dispensed.

FIGURE 4 illustrates the embodiment of FIGURE 3 modified to provide means for sterilising a cap with the bottle and for placing the sterilised cap on the filled container. Elements in the embodiment illustrated in FIGURE 4 that are similar to elements in the embodiment illustrated in FIGURE 3 have been given the same reference numerals with the suffix "b" added.

The head of the housing 26 is split horizontally as illustrated. The lower portion 31, attached to the container 2b is suspended on the shoulders 32, of pins 33, attached to upper portion 34. Springs 36 ensure positive downward location of the container 2b except when it is closed under pressure during bottle sterilisation and filling. A cap 35 enters the housing 31 through a slot 37 and falls into another slot 38 through the hole 39 to rest as shown at a station at the right hand end of the slot 38 as seen in FIGURE 4. Closure of the two portions 31 and 34 of the housing from below, as a bottle enters, compresses springs 36 until the upper and lower portions meet to form a steam and vacuum tight seal. The plug 41 forms a seal on the hole 39. The cap 35 is then sterilised by steam under pressure at the same time as the bottle.

After the bottle is filled, the pedestal 11 and hence the bottle are lowered slightly, and the cap is moved across over the bottle by a jet of gas or fluid, e.g., steam, applied at the orifice 42, or by mechanical means. The pedestal 11 rises to press the bottle and cap against the seal 8b to secure the cap on the bottle. The bottle can then be removed from the container.

FIGURE 5 shows another embodiment of the valve for dispensing liquid into a bottle. This embodiment is similar to the previous embodiments. Elements in the embodiments illustrated in FIGURE 5 that are similar to elements in the previously described embodiments have been given the same reference numerals with the suffix "c" added. This embodiment differs from the previous embodiments in that there is no sleeve surrounding the plunger 18 and coaxial with the plunger 18c and the tube 14c. As before, the tube 14c is connected to a source of milk through a bellows (not shown) or any other flexible connection which will allow axial movement of the tube 14c. The tube 14c is biased downwards by a spring 46 the bottom end of which engages with a shoulder 47 near the mouth of the tube 14c, and the top end of which engages with a shoulder 48 welded to the rod 21c. The bottom end of the tube 14c is closed by a ground seal 49 between the tube and the plunger 18c. A one way seal 51 seals the plunger 18c to the housing 50 and isolates the ground seal 49 from the steam pressure in the interior of the bottle during sterilisation. Another one-way seal 52 seals the tube 14 to the housing 50 and seals off the bottle during partial evacuation of the bottle. Thus the seal 51 is adapted to maintain a positive steam pressure within the bottle, and the seal 52 is adapted to maintain a partial vacuum within the bottle. The seal 52 also acts as a safety valve in the event of failure of the seal 51 during sterilisation. Steam which manages to leak past the seal 51 can vent to atmosphere through the seal 52, thus protecting the ground seal 49 from the steam. Another seal 53 is adapted to seal the tube 14c with the mouth of the bottle so that the bottle is isolated from its surroundings, except through the tube 14c.

To fill a bottle, the valve is initially in the position shown with the tube 14c closed by the plunger 18c. In operation, the plunger is lowered by means of the rod 21c, and the tube 14c, which is biased against the plunger 18 by the spring 46, moves down with the plunger. As the plunger and tube move downwards, the plunger 18c moves past the seal 51 and the tube 14c moves into engagement with the seal 51 thus sealing the tube to the housing. Further downward movement of the tube and plunger moves the tube into engagement with the seal 53 thus sealing the tube with the mouth of the bottle and isolating the bottle. After this seal has been made, a shoulder 54 on the tube 14c engages with the housing and prevents any further downward movement of the tube. The plunger 18c, however, continues its downward travel, thus opening the tube 14c and allowing liquid to flow into the bottle. The plunger is then raised to its initial position, carrying the tube back up with it.

FIGURE 5 also shows part of the apparatus for sterilizing the bottle. Steam flows into and out of the container (not shown) surrounding the bottle through a conduit 56. Some of the steam also flows from the conduit 56 out through the main orifice 57 of the steam ejector device 6c which draws a partial vacuum inside the bottle through the channel 58. When the valve 4 (FIGURE 1) is closed, the steam passing out through the main orifice 57 gets directed into the bottle through the channel 58.

From the above description, it can be seen that the present invention provides a useful system for sterilising and filling bottles.

What is claimed is:

1. Apparatus for sterilising a container by means of steam under pressure comprising a sealable chamber for housing the container, the chamber having inlet and exit means for the passage of steam into and out of the chamber, a valve disposed in said exit means, said valve having two positions and being adapted in one of said positions to permit the exit of steam and being adapted in the other of said positions to divert steam into the container.

2. Apparatus as claimed in claim 1, including vacuum means adapted to create a partial vacuum within the container when the valve is in said one of said positions.

3. A method of sterilising a container by means of steam under pressure, comprising the steps of preheating the container, from the outside thereof, within a chamber by initially passing the steam into and out of the chamber, and then introducing steam into the container to sterilise the inside surface thereof, shutting off the supply of steam to the inside of the container, allowing any condensate within the container to boil off under the action of heat, and sealing the opening of the container during preheating to prevent any steam from entering the container.

4. A method of sterilising a container by means of steam under pressure, comprising the steps of preheating the container, from the outside thereof, within a chamber by initially passing the steam into and out of the chamber, and then introducing steam into the container to sterilise the inside surface thereof, shutting off the supply of steam to the inside of the container, allowing any condensate within the container to boil off under the action of heat, and creating a partial vacuum within the container prior to introducing steam into the container to sterilise the inside surface thereof to prevent air from interfering with the sterilising effect of the steam subsequently introduced.

5. A method of sterilising a container by means of steam under pressure, comprising the steps of preheating the container, from the outside thereof, within a chamber by initially passing the steam into and out of the chamber, and then introducing steam into the container to sterilise the inside surface thereof, shutting off the supply of steam to the inside of the container, allowing any condensate within the container to boil off under the action of heat, and creating a partial vacuum within the container after the sterilisation thereof, to supplement the action of heat in the removal of condensate.

References Cited

UNITED STATES PATENTS

| | | | |
|---|---|---|---|
| 626,579 | 6/1899 | Viele. | |
| 2,660,513 | 11/1953 | Ball | 21—56 |
| 3,026,791 | 3/1962 | Wegener. | |
| 3,392,034 | 7/1968 | Barnes | 99—251 XR |

MORRIS O. WOLK, Primary Examiner

D. G. MILLMAN, Assistant Examiner

U.S. Cl. X.R.

21—78; 99—216, 251; 141—85